(12) United States Patent
Tsuzaki et al.

(10) Patent No.: US 11,549,544 B2
(45) Date of Patent: Jan. 10, 2023

(54) BOLT AND METHOD OF MANUFACTURING THE SAME

(71) Applicants: HONDA MOTOR CO., LTD., Tokyo (JP); Saga Tekkohsho Co., Ltd., Saga (JP)

(72) Inventors: Kazuhiro Tsuzaki, Saitama (JP); Toshitsugu Sakakibara, Saitama (JP); Kenichiro Katsuki, Saga (JP)

(73) Assignees: HONDA MOTOR CO., LTD., Tokyo (JP); SAGA TEKKOHSHO CO., LTD., Saga (JP)

( * ) Notice: Subject to any disclaimer, the term of this patent is extended or adjusted under 35 U.S.C. 154(b) by 534 days.

(21) Appl. No.: 16/527,942

(22) Filed: Jul. 31, 2019

(65) Prior Publication Data
US 2020/0040931 A1 Feb. 6, 2020

(30) Foreign Application Priority Data

Aug. 3, 2018 (JP) .............................. JP2018-146817

(51) Int. Cl.
*F16B 33/00* (2006.01)
*F16B 23/00* (2006.01)
(Continued)

(52) U.S. Cl.
CPC .............. *F16B 33/00* (2013.01); *B21K 1/463* (2013.01); *B21K 1/56* (2013.01); *F16B 23/00* (2013.01);
(Continued)

(58) Field of Classification Search
CPC ..... G01N 2291/0289; G01N 2291/044; G01N 2291/2691; G01N 29/04; G01N 29/043; F16B 23/0007; F16B 23/0053
See application file for complete search history.

(56) References Cited

U.S. PATENT DOCUMENTS

| 4,899,591 A | 2/1990 | Kibblewhite |
| 5,220,839 A * | 6/1993 | Kibblewhite ......... B06B 1/0662 |
| | | 73/761 |

(Continued)

FOREIGN PATENT DOCUMENTS

| CN | 1628220 A | 6/2005 |
| CN | 102444653 A | 5/2012 |

(Continued)

OTHER PUBLICATIONS

Chinese Office Action with English translation dated Oct. 22, 2020, 13 pages.

(Continued)

*Primary Examiner* — Roy Y Yi
*Assistant Examiner* — Geoffrey T Evans
(74) *Attorney, Agent, or Firm* — Rankin, Hill & Clark LLP

(57) ABSTRACT

A bolt includes a head portion on which a recess is formed. The recess has a bottom surface and a sidewall extending from a periphery of the bottom surface. The sidewall has a lower end defined by the bottom surface and includes an increased diameter portion and a reduced diameter portion. The increased diameter portion has an inner diameter larger than an inner diameter of the lower end of the side wall. The reduced diameter portion has an inner diameter smaller than the inner diameter of the increased diameter portion. The reduced diameter portion is located opposite to the bottom surface across the increased diameter portion.

10 Claims, 4 Drawing Sheets

(51) Int. Cl.
   *G01N 29/04*   (2006.01)
   *B21K 1/56*   (2006.01)
   *B21K 1/46*   (2006.01)

(52) U.S. Cl.
   CPC ...... *F16B 23/0007* (2013.01); *F16B 23/0053* (2013.01); *G01N 29/04* (2013.01); *B23G 2240/52* (2013.01); *G01N 2291/0289* (2013.01); *G01N 2291/2691* (2013.01)

(56) References Cited

U.S. PATENT DOCUMENTS

| | | |
|---|---|---|
| 2003/0053886 A1 | 3/2003 | Ueno |
| 2005/0129486 A1 | 6/2005 | Totsu |
| 2012/0088075 A1 | 4/2012 | Diehl et al. |
| 2017/0234355 A1* | 8/2017 | Bielecki ................ F16B 41/005 411/429 |

FOREIGN PATENT DOCUMENTS

| | | |
|---|---|---|
| CN | 204685934 U | 10/2015 |
| JP | H07-305710 | 11/1995 |
| JP | 2003-090322 A | 3/2003 |

OTHER PUBLICATIONS

Japanese Office Action with English translation, dated May 12, 2020, 7 pages.

\* cited by examiner

BOLT AND METHOD OF MANUFACTURING THE SAME

CROSS-REFERENCE TO RELATED APPLICATIONS

The present application claims priority under 35 U.S.C. § 119 to Japanese Patent Application No. 2018-146817, filed Aug. 3, 2018, the contents of which are hereby incorporated by reference in their entirety.

BACKGROUND OF THE INVENTION

1. Field of the Invention

The present invention relates to a bolt and a method of manufacturing the same.

2. Description of the Related Art

Conventionally, there has been known a bolt with a head portion having a recess with an opening on an upper face side of the head portion (see, for example, Japanese Patent Application Publication No. H07-305710). This recess defines a columnar space formed coaxially with the bolt shaft portion. This recess is, for example, fitted with a balance piece used as a coupling for a rotation shaft.

SUMMARY OF THE INVENTION

In general, oil for rust prevention is sometimes applied to the surface of a bolt. In the case of a bolt with a head portion having a recess (see, for example, Japanese Patent Application Publication No. H07-305710), the oil is likely to accumulate in this recess.

When such a bolt is rotated to be tightened by an electric torque wrench or the like, the oil inside the recess may possibly spatter and smear the surroundings.

In view of this, an object of the present invention is to provide a bolt and a method of manufacturing the same that are capable of restraining a fluid such as the oil accumulating in a recess formed a head portion of the bolt from flowing out.

A bolt according to an embodiment of the present invention includes: a head portion on which a recess is formed. The recess has a bottom surface and a sidewall extending from a periphery of the bottom surface. The sidewall has a lower end defined by the bottom surface and includes an increased diameter portion and a reduced diameter portion. The increased diameter portion has an inner diameter larger than an inner diameter of the lower end of the side wall. The reduced diameter portion has an inner diameter smaller than the inner diameter of the increased diameter portion. The reduced diameter portion is located opposite to the bottom surface across the increased diameter portion.

A method according to an embodiment of the present invention is a method of manufacturing a bolt having a shaft portion and a head portion with a recess. The method includes: forming the shaft portion by performing a shaft reducing process on a wire rod; and forming the head portion by performing an upsetting process on one end portion of the wire rod on a side opposite from the shaft portion. A molding die for performing the upsetting process has a bottom portion and a stepped protrusion formed on the bottom portion. The stepped protrusion is located at a position corresponding to the recess and is configured to be pressed into the one end portion of the wire rod. The stepped protrusion includes: a first columnar portion formed on the bottom portion; and a second columnar portion formed coaxially on the first columnar portion and having a smaller diameter than the first columnar portion.

According to the present invention, it is possible to provide a bolt and a method of manufacturing the same that are capable of restraining flowing out of a fluid such as oil accumulating in a recess formed in a head portion of the bolt.

DETAILED DESCRIPTION OF THE EMBODIMENTS

A mode for carrying out the present invention (present embodiment) will be described in detail with reference to the drawings as appropriate. The bolt of the present embodiment is a bolt to be inspected by an elongation measurement, a flaw detection test, and the like utilizing ultrasonic waves. However, the bolt of the present invention is not limited to this application and has a novel configuration that achieves advantageous effects even when used as a general-purpose bolt.

Hereinafter, the bolt of the present embodiment and a method of manufacturing this bolt are described in detail.

Bolt

Figure 1:
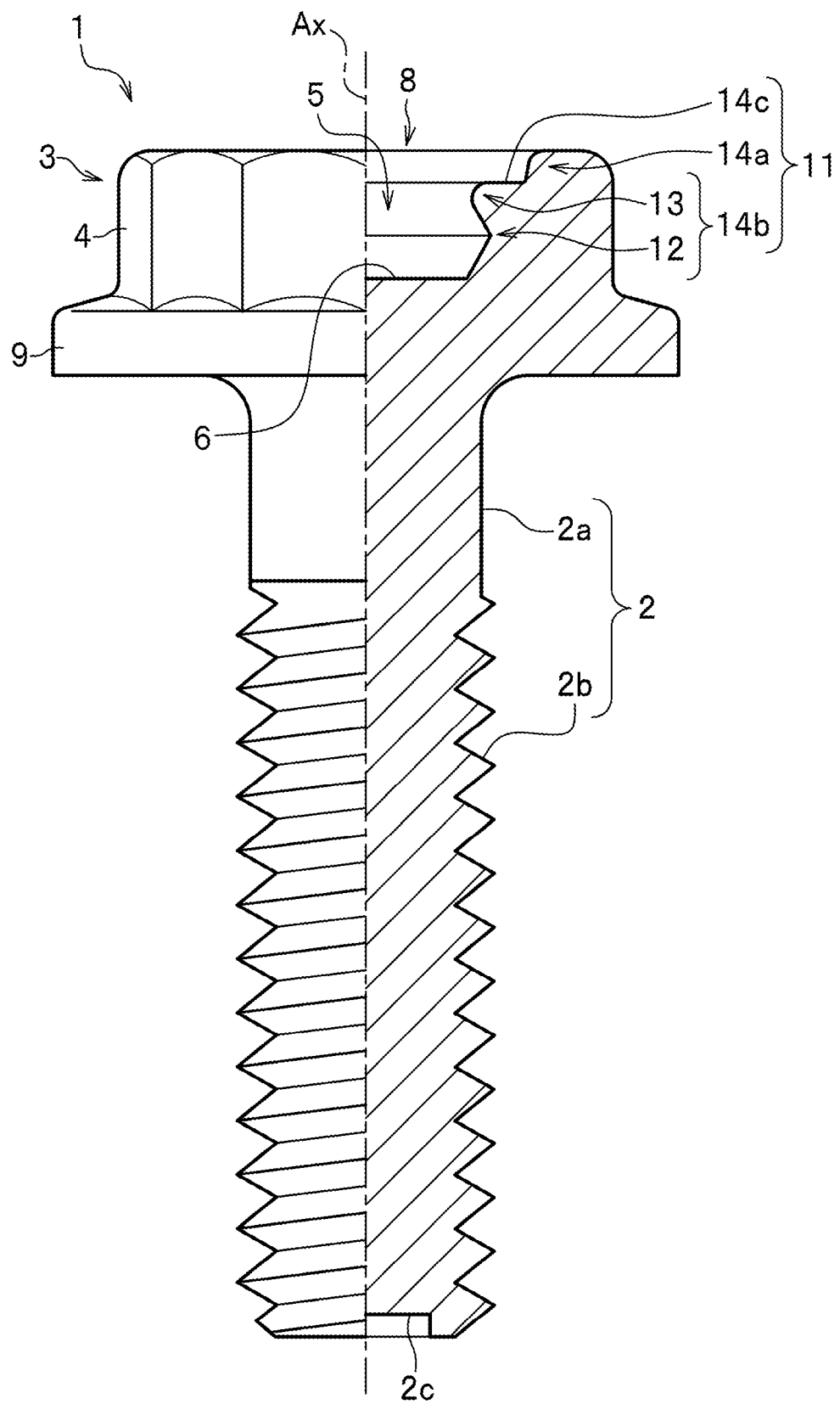
FIG. 1 is an explanatory view for explaining the configuration of a bolt according to an embodiment of the present invention.

FIG. 1 is an explanatory view for explaining the configuration of a bolt 1 according to the present embodiment. FIG. 1 is a partially cross-sectional side view of the bolt 1, showing a cross section of the bolt 1 on the right side of the axis Ax of the bolt 1.

As shown in FIG. 1, the bolt 1 of the present embodiment includes a shaft portion 2 and a head portion 3.

The shaft portion 2 mainly includes a columnar portion 2a and a threaded portion 2b.

On a distal end portion of the threaded portion 2b, a bottom surface 2c of the bolt 1 is defined for use in later-described measurement of the elongation of the bolt 1.

Formed on an outer peripheral portion of the head portion 3 is an engaging portion 4 that is engageable with a tightening tool (for example, a torque wrench or the like) for the bolt 1. The head portion 3 has a recess 5 formed thereon.

This recess 5 has a bottom surface 6 and a sidewall 11 extending from a periphery of the bottom surface 6 generally upward (outward in an axial direction of the bolt 1) and outward (outward in a radial direction of the bolt 1).

The bottom surface 6 is formed such that it includes a plane whose normal is parallel with an axis Ax of the bolt 1.

The sidewall 11 includes a large diameter portion 14a on a side opposite the shaft portion 2, a small diameter portion 14b on aside of the shaft portion 2, and a step portion 14c therebetween. The large diameter portion 14a defines an opening 8 of the recess 5 and has a larger inner diameter than the small diameter portion 14b. The large diameter portion 14a is joined to the small diameter portion 14b via the step portion 14c, which absorbs the difference in inner diameter. The large diameter portion 14a, the step portion 14c, and the small diameter portion 14b form the recess 5 (stepped recess) in the head portion 3 of the bolt 1 so that the recess 5 has a step and is coaxial with the bolt axis Ax.

Although the step portion 14c in the present embodiment has a surface parallel to the bottom surface 6, the step portion 14c may have a surface inclined with respect to the bottom surface 6 so long as the step portion 14c can come into abutment with the later-described step portion 24b of a probe 24 (see FIG. 3).

The small diameter portion 14b of the sidewall 11 has an increased diameter portion 12 and a reduced diameter portion 13.

The increased diameter portion 12 is located intermediate an upper end of the small diameter portion 14b and a lower end thereof that is on the side of the bottom surface 6.

The increased diameter portion 12 has a larger inner diameter than a lower end of the sidewall 11 that is defined by the bottom surface 6. Incidentally, according to the present embodiment, the lower end of the sidewall 11 corresponds to the lower end of the small diameter portion 14b.

The reduced diameter portion 13 is located on the side of an opening 8 of the recess 5, next to the increased diameter portion 12. The reduced diameter portion 13 has an inner diameter smaller than the inner diameter of the increased diameter portion 12.

Note that in FIG. 1, reference numeral 9 denotes a flange portion of the bolt 1.

Method of Manufacturing Bolt

The bolt 1 (see FIG. 1) of the present embodiment is obtained by compression-molding a metal coil material (wire rod) cut into a predetermined length. Specifically, the bolt 1 is obtained by performing end face correction, a forward or backward extrusion process (shaft reducing process), an upsetting process, a trimming process, a threading process, and the like on a wire rod made of carbon steel, stainless steel, chrome molybdenum steel, or a non-ferrous metal.

The method of manufacturing the bolt 1 according to the present embodiment is characterized mainly in the molding of the head portion 3.

FIGS. 2A to 2D are explanatory views for explaining the steps of the method of manufacturing the bolt 1 shown in FIG. 1. Specifically, FIGS. 2A to 2D represent a series of steps to be performed in order, which forms the head portion 3 on a wire rod 15 on which the shaft portion 2 has been formed by a shaft reducing process.

Figure 2A:
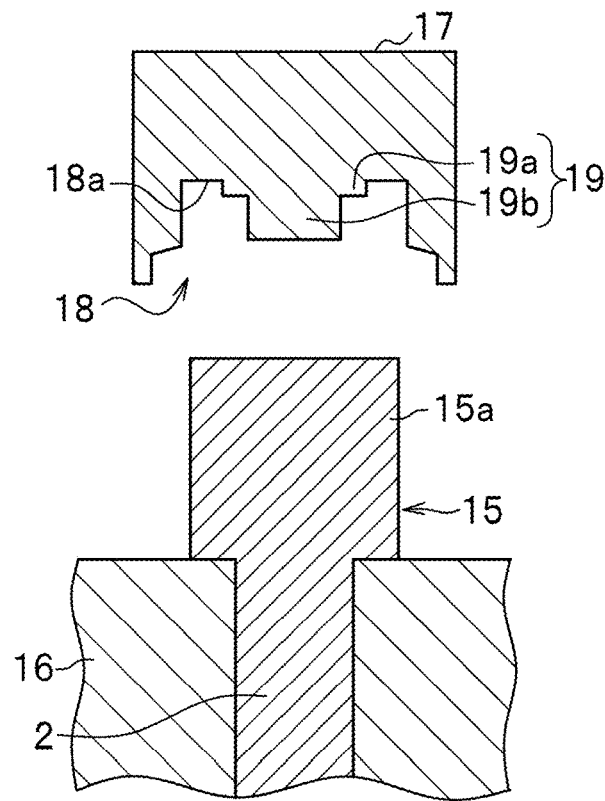
FIGS. 2A to 2D are explanatory views for explaining the steps of a method of manufacturing the bolt shown in FIG. 1.

As shown in FIG. 2A, according to this manufacturing method, the shaft portion 2 formed by the shaft reducing process is arranged in a lower die 16. Reference numeral 15a denotes one end portion of the wire rod 15 that is on the opposite side from the shaft portion 2 and reference numeral 17 denotes an upper die (molding die) for performing an upsetting process on the one end portion 15a of the wire rod 15 to form the head portion 3 (see FIG. 1).

This upper die 17 has a recess 18 which is open toward the lower die 16. The opening inner diameter of this recess 18 is set to be larger than the outer diameter of the wire rod 15.

Formed on a central portion of a bottom portion 18a of the upper die 17 is a stepped protrusion 19.

This stepped protrusion 19 has a first columnar portion 19a on the bottom portion 18a side and a second columnar portion 19b having a smaller diameter than the first columnar portion 19a.

The stepped protrusion 19 is formed on the upper die 17 such that it corresponds to the recess 5 on the head portion 3 (see FIG. 1).

Figure 2B:
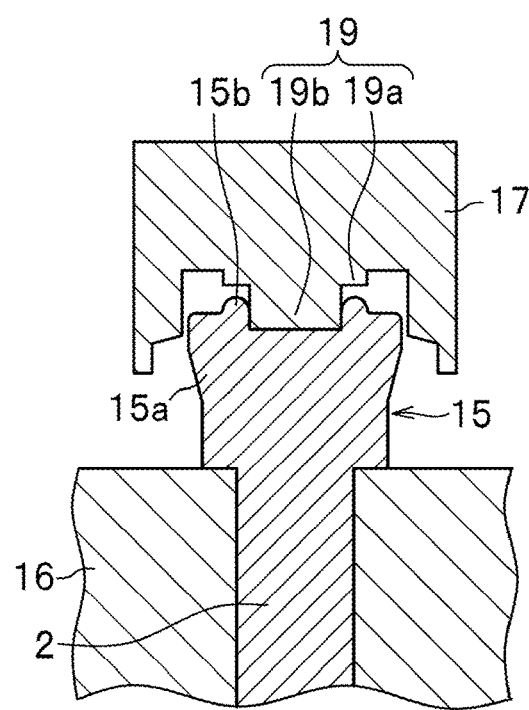

As shown in FIG. 2B, according to this manufacturing method, the second columnar portion 19b of the upper die 17 is pressed into the one end portion 15a of the wire rod 15. As a result, the diameter of the wire rod 15 is increased in the recess 18 of the upper die 17, and part of the wire rod 15 plastically flows to form an annular raised portion 15b around the second columnar portion 19b.

Figure 2C:
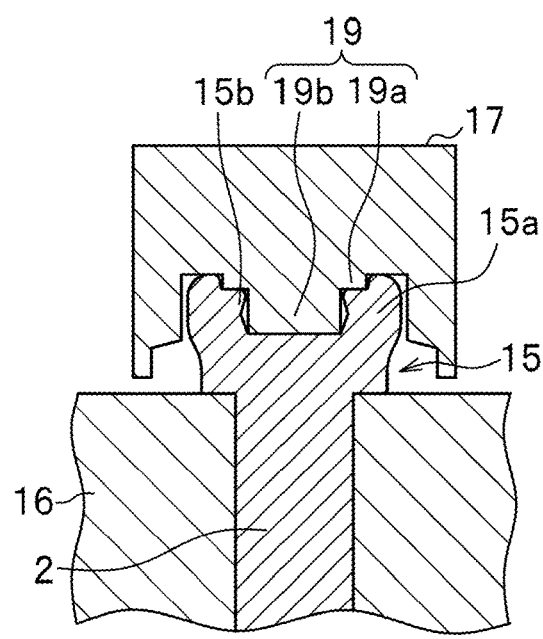

As shown in FIG. 2C, following the second columnar portion 19b, the first columnar portion 19a is pressed into the one end portion 15a of the wire rod 15. Then, part of the one end portion 15a of the wire rod 15 further plastically flows into the bottom portion 18a of the upper die 17. In this event, the annular raised portion 15b is pressed by the upper face (step portion) of the first columnar portion 19a and thereby the annular raised portion 15b is deformed. In this deformation, an intermediate portion of an inner wall of the annular raised portion 15b is deformed in a direction away from the axial center of the wire rod 15. In addition, around the first columnar portion 19a, the part of the one end portion 15a of the wire rod 15 plastically flows in a radially outward direction.

Figure 2D:
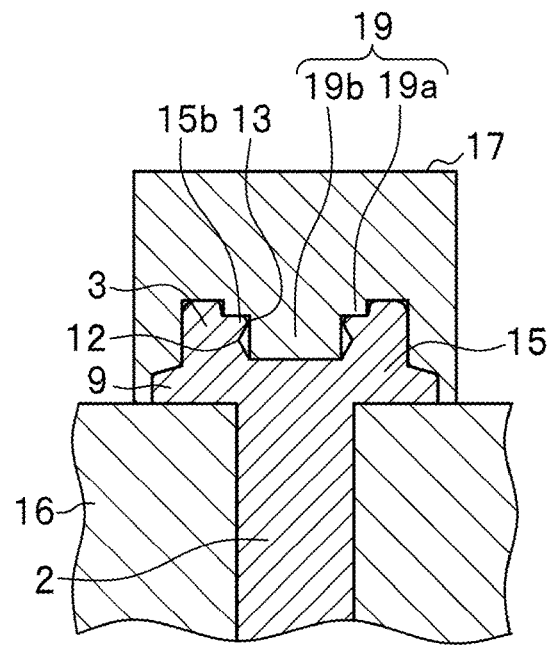

In this way, as shown in FIG. 2D, the above-described reduced diameter portion 13 is formed by the deformed raised portion 15b, and the above-described increased diameter portion 12 is formed about a body portion of the second columnar portion 19b. The plastic flow of the wire rod 15 that has flowed along the outer surfaces of the first columnar portion 19a and the bottom portion 18a forms the large diameter portion 14a (see FIG. 1). The plastic flow of the wire rod 15 that has flowed about the second columnar portion 19b forms the small diameter portion 14b (see FIG. 1). Moreover, by the upper die 17, the engaging portion 4 (see FIG. 1), which is to be engaged with a tightening tool such as a torque wrench, is formed around the head portion 3. Note that reference numeral 9 in FIG. 2D denotes the flange portion.

Then, the threaded portion 2b (see FIG. 1) is formed on the shaft portion 2 by, for example, rolling, and the bolt 1 of the present embodiment is completed.

Setting of Probe to Bolt

Next, a description will be given of setting a probe for ultrasonic measurement on a bolt to be inspected.

Figure 3:
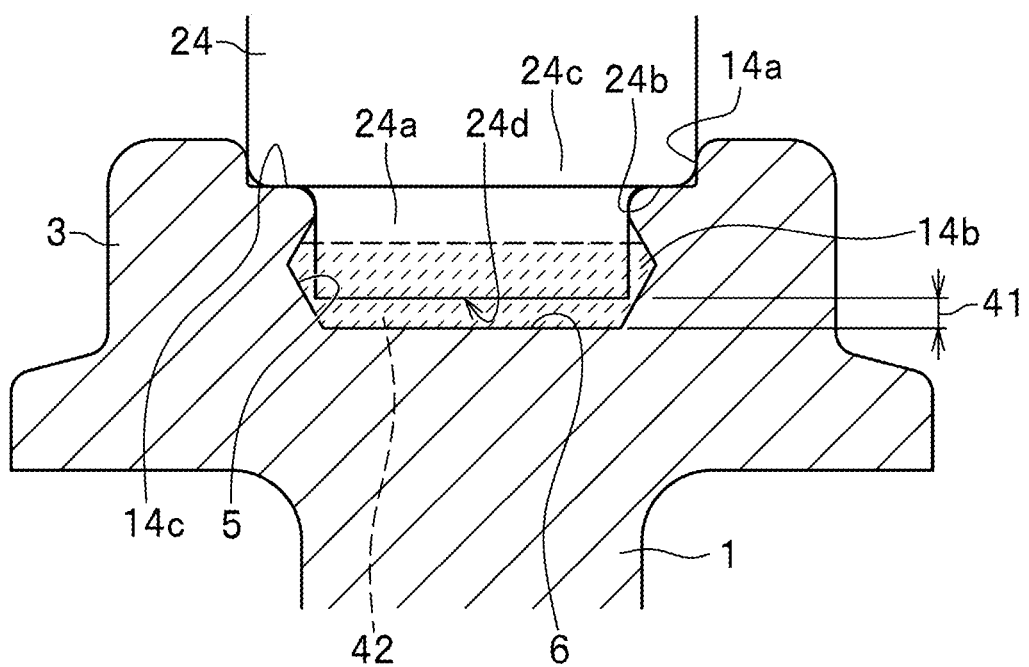
FIG. 3 is a partial enlarged cross-sectional view showing a state where a probe is interfitted into the bolt according to the embodiment of the present invention.

FIG. 3 is a partial enlarged cross-sectional view showing a state where a probe 24 is interfitted into the bolt 1.

As shown in FIG. 3, when conducting an ultrasonic measurement on the bolt 1, the probe 24 is interfitted into the recess 5 (stepped recess) of the bolt 1.

In this interfitting, an outer surface of a distal end body portion 24c of the probe 24 comes into contact with an inner surface of the large diameter portion 14a of the sidewall 11 of the recess 5.

A projecting portion 24a of the probe 24 is housed in the small diameter portion 14b of the sidewall 11 of the recess 5.

When the probe 24 is interfitted into the bolt 1 as described above, a gap 41 is formed between the bottom surface 6 of the recess 5 and a top surface 24d of the projecting portion 24a, wherein the bottom surface 6 defines a surface of the bolt 1 and the top surface 24d defines a surface of the probe 24.

Specifically, the step portion 14c of the bolt 1 and the step portion 24b of the probe 24 come into abutment with each other to form the gap 41. This gap 41 is formed by the bottom surface 6 of the recess 5 and the top surface 24d of the projecting portion 24a facing each other in parallel.

This gap 41 is filled with a propagation medium 42.

This propagation medium 42 is not particularly limited, and examples of the propagation medium 42 include publicly-known propagation mediums such as a machine oil, water, a water-containing polymer, liquid paraffin, castor oil, a gel material, and an elastomer. Among these, the gel material and the elastomer are desirable.

When conducting an elongation measurement, a flaw detection test, or the like using ultrasonic waves on such a bolt 1, the probe 24 emits ultrasonic pulses to the bolt 1, which is not illustrated, though. Then, the elongation of the bolt 1 or a flaw in the bolt 1 can be detected on the basis of the echoes of the emitted ultrasonic pulses.

Operations and Advantageous Effects

Next, a description will be given of the operations and advantageous effects achieved by the present embodiment.

In general, for example, oil for rust prevention is often applied to bolts. However, in the case of a bolt with a head portion having a recess, the oil is likely to accumulate in this recess.

When such a bolt is rotated to be tightened by an electric torque wrench or the like, the oil inside the recess may possibly spatter and smear the surroundings.

However, the bolt 1 of the present embodiment includes the increased diameter portion 12 and the reduced diameter portion 13 on the sidewall 11 of the recess 5. According to this structure of the bolt 1, even when the oil has accumulated in the bottom of the recess 5, this oil is gathered on the increased diameter portion 12 by a centrifugal force generated due to rotation.

Therefore, the structure of the bolt 1 of the present embodiment makes it possible to avoid the oil from spattering at the time of rotation.

The bolt 1 of the present embodiment includes the increased diameter portion 12 above the bottom surface 6. The bolt 1 makes it possible to reduce the amount of the oil accumulated in the recess 5 compared to a bolt having an increased diameter portion 12 on the outer edge of the bottom surface 6, for example. With this structure of the bolt 1, it is possible to more reliably avoid the oil from spattering at the time of rotation.

In general, a bolt to be inspected with an ultrasonic measurement using a probe placed in a recess formed on a head portion of the bolt has variations in the flatness or the like of a bottom surface of the recess, which defines the surface of the bolt. For this reason, in a measurement configuration in which the probe is brought into tight contact with the bottom surface of the recess, the accuracy of the ultrasonic measurement values is likely to be insufficient.

In contrast, the bolt 1 of the present embodiment includes the step portion 14c in the recess 5. According to such a structure of the bolt 1, the step portion 14c supports the probe 24 to form the gap 41 between the probe 24 and the bottom surface 6 of the recess 5. Therefore, this structure of the bolt 1 makes it possible to dramatically improve the accuracy of the ultrasonic measurement values.

In addition, according to the structure of the bolt 1 of the present embodiment, it is possible to avoid a ultrasonic wave propagation medium, which is filled in the gap 41, from spattering at the time of rotation of the bolt 1, as in the case of the above-described rust preventive oil. Moreover, according to the structure of the bolt 1, it is possible to reduce the amount of the propagation medium accumulated in the recess 5 as in the above case. Therefore, the structure of the bolt 1 makes it possible to more reliably avoid the propagation medium from spattering at the time of rotation.

In addition, according to the structure of the bolt 1, the increased diameter portion 12 is formed above the bottom surface 6 of the recess 5. Thus, in a case where the propagation medium is an elastomer, it is possible to provide a space into which the elastomer pressed by the probe 24 flows.

In general, a bolt like the bolt 1 including the increased diameter portion 12, the reduced diameter portion 13, and the step portion 14c has been formed by cutting out the recess 5.

In contrast, according to the method of manufacturing the bolt 1 of the present embodiment, it is possible to manufacture the bolt 1 by heading the wire rod 15. Therefore, the steps of manufacturing the bolt 1 are simplified and the manufacturing cost for the bolt 1 can be significantly reduced.

According to the present embodiment, it is possible to form the increased diameter portion 12 and the reduced diameter portion 13 next to each other in the small diameter portion 14b of the recess 5 by pressing the stepped protrusion 19 into the one end portion 15a of the wire rod 15.

In addition, according to the present embodiment, the outer shape of the probe 24 and the second columnar portion 19b of the upper die 17, which forms the recess 5 (stepped recess) in the head portion 3, have substantially the same shape. Therefore, it is possible to utilize the design data of the probe 24 and the design data of the upper die 17 in an interchangeable manner, and to reduce the manufacturing cost of the bolt 1.

The probe 24 is interfitted into the recess 5 of the bolt 1 of the present embodiment. This allows the probe 24 to be firmly fixed to the recess 5 of the bolt 1. Therefore, this bolt 1 can be inspected with high accuracy using ultrasonic measurement techniques.

Although the embodiment of the present invention has been described above, the present invention is not limited to the above-described embodiment and may be implemented in various forms.

According to the above-described embodiment, the increased diameter portion 12 is formed substantially on a depth direction middle portion of the small diameter portion 14b. However, the position of the increased diameter portion 12 may be appropriately changed as necessary.

Figure 4A:
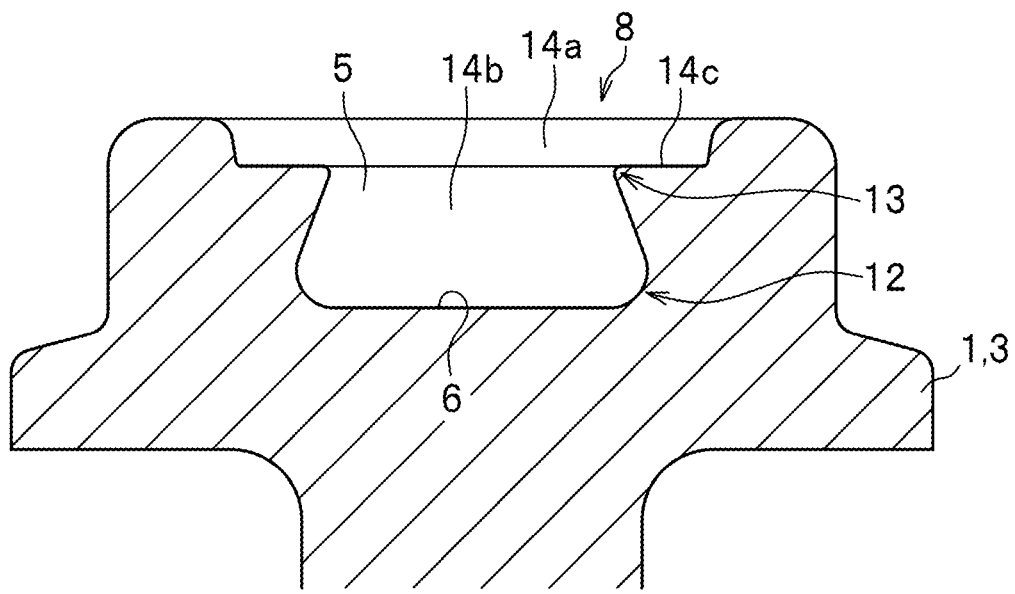
FIGS. 4A and 4B are partial enlarged cross-sectional views of bolts according to modifications.
Figure 4B:
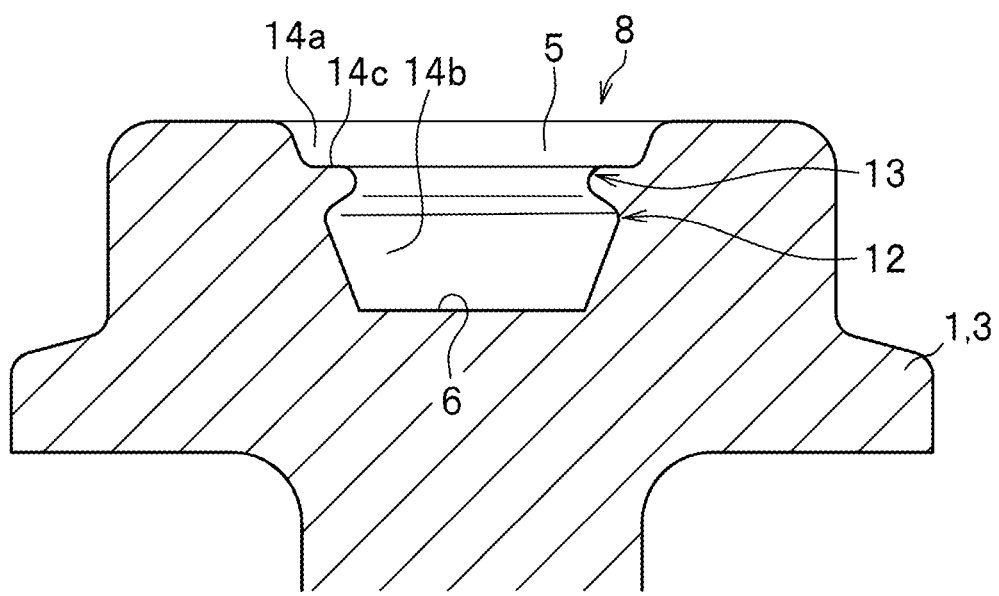

FIGS. 4A and 4B are partial enlarged cross-sectional views of head portions 3 of bolts 1 according to modifications. In these modifications, the same reference numerals are given to the same constituent elements as those of the above-described embodiment, and duplicative descriptions thereof will be omitted.

The bolt 1 shown in FIG. 4A 1 is configured such that the increased diameter portion 12 is formed at a position close to the bottom surface 6 of the recess 5. According to the structure of this bolt 1, since the sidewall 11 is inclined toward the axis of the bolt 1 as extending upward, it is possible to make the step portion 14c wider. With this structure of the bolt 1, the contact area of the probe 24 (see FIG. 3) against the recess 5 is increased. As a result, the probe 24 is stably placed in the recess 5. Note that in FIG. 4A, reference numeral 14a denotes a large diameter portion, reference numeral 14b denotes a small diameter portion, reference numeral 13 denotes a reduced diameter portion, and reference numeral 8 denotes an opening of the recess 5.

The bolt 1 shown in FIG. 4B is configured such that the increased diameter portion 12 is formed at a position relatively close to the opening 8 of the recess 5. In this bolt 1, the sidewall 11 is inclined outward (away from the axis of the bolt 1) as extending upward. According to the structure of the bolt 1, in a case where the propagation medium is an elastomer, it is possible to more securely provide a space into which the elastomer pressed by the probe 24 (see FIG. 3) flows. Note that in FIG. 4B, reference numeral 14a denotes a large diameter portion, reference numeral 14b denotes a small diameter portion, and reference numeral 13 denotes a reduced diameter portion.

What is claimed is:

1. A bolt comprising:
a head portion on which a recess is formed,
wherein the recess has a bottom surface and a sidewall extending from a periphery of the bottom surface,
wherein the sidewall has a lower end defined by the bottom surface and includes an increased diameter portion and a reduced diameter portion, the increased diameter portion having an inner diameter larger than an inner diameter of the lower end of the sidewall, the reduced diameter portion having an inner diameter smaller than the inner diameter of the increased diameter portion, the reduced diameter portion located opposite to the bottom surface across the increased diameter portion.

2. The bolt according to claim 1,
wherein the sidewall of the recess has:
a small diameter portion that defines the increased diameter portion and the reduced diameter portion; and
a large diameter portion formed next to the reduced diameter portion with a step portion therebetween, the large diameter portion defining an opening of the recess, the opening having an inner diameter larger than the inner diameter of the reduced diameter portion, and
wherein the bottom surface is formed such that the bottom surface includes a plane whose normal is parallel with an axis of the bolt.

3. The bolt according to claim 2,
wherein the sidewall of the recess has a portion extending from the lower end of the sidewall to the increased diameter portion outward in an axial direction of the bolt and outward in a radial direction of the bolt.

4. The bolt according to claim 1,
wherein the sidewall of the recess has a portion extending from the lower end of the sidewall to the increased diameter portion outward in an axial direction of the bolt and outward in a radial direction of the bolt.

5. A bolt comprising:
a head portion on which a recess is formed,
wherein the recess has a bottom surface and a sidewall extending from a periphery of the bottom surface,
wherein the sidewall has a lower end defined by the bottom surface and includes an increased diameter portion and a reduced diameter portion, the increased diameter portion having an inner diameter larger than an inner diameter of the lower end of the sidewall, the reduced diameter portion having an inner diameter smaller than the inner diameter of the increased diameter portion, the reduced diameter portion located opposite to the bottom surface across the increased diameter portion, and
wherein the bolt can be inspected by ultrasonic waves in such a manner that a probe for ultrasonic testing is placed in the recess.

6. The bolt according to claim 5,
wherein the sidewall of the recess has:
a small diameter portion that defines the increased diameter portion and the reduced diameter portion; and
a large diameter portion formed next to the reduced diameter portion with a step portion therebetween, the large diameter portion defining an opening of the recess, the opening having an inner diameter larger than the inner diameter of the reduced diameter portion, and
wherein the bottom surface is formed such that the bottom surface includes a plane whose normal is parallel with an axis of the bolt.

7. The bolt according to claim 6,
wherein the sidewall of the recess has a portion extending from the lower end of the sidewall to the increased diameter portion outward in an axial direction of the bolt and outward in a radial direction of the bolt.

8. The bolt according to claim 5,
wherein the sidewall of the recess has a portion extending from the lower end of the sidewall to the increased diameter portion outward in an axial direction of the bolt and outward in a radial direction of the bolt.

9. A method of manufacturing a bolt having a shaft portion and a head portion with a recess, the method comprising:
forming the shaft portion by performing a shaft reducing process on a wire rod; and
forming the head portion by performing an upsetting process on one end portion of the wire rod on a side opposite from the shaft portion,
wherein a molding die for performing the upsetting process has a bottom portion and a stepped protrusion formed on the bottom portion, the stepped protrusion located at a position corresponding to the recess, the stepped protrusion configured to be pressed into the one end portion of the wire rod, and
wherein the stepped protrusion includes:
a first columnar portion formed on the bottom portion; and
a second columnar portion formed coaxially on the first columnar portion and having a smaller diameter than the first columnar portion.

10. The method of manufacturing a bolt according to claim 9,
wherein the bolt can be inspected by ultrasonic waves in such a manner that a probe for ultrasonic testing is placed in the recess formed by pressing the stepped protrusion into the one end portion of the wire rod.

* * * * *